June 15, 1954  D. K. GOWLAND  2,680,921
MODEL SAILING SHIP

Filed July 9, 1952  3 Sheets-Sheet 1

INVENTOR.
Douglas Kelvin Gowland
BY
H. W. Breleford
ATTORNEY

June 15, 1954
D. K. GOWLAND
2,680,921
MODEL SAILING SHIP
Filed July 9, 1952
3 Sheets-Sheet 2
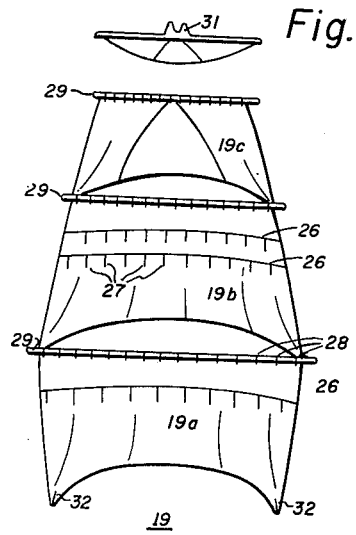
Fig. 3
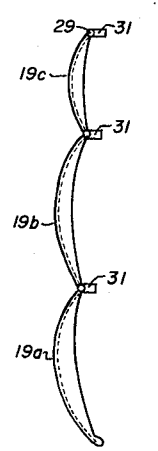
Fig. 5
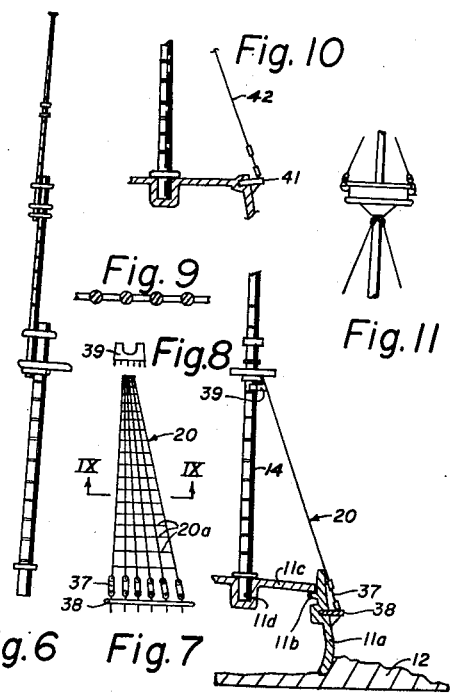
Fig. 6  Fig. 7
Fig. 12
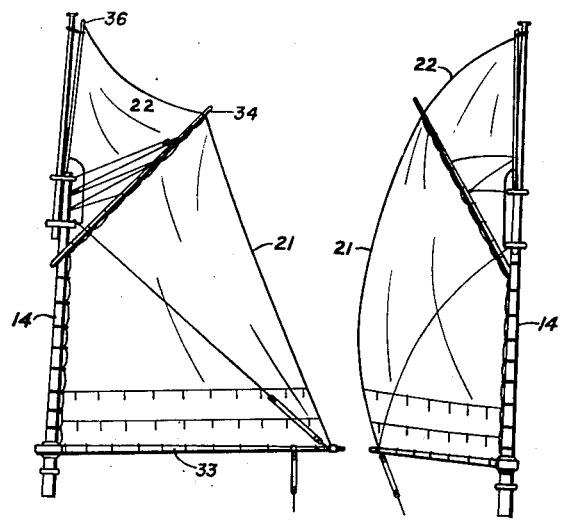
Fig. 13  Fig. 14
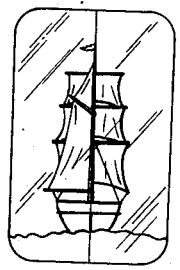
Fig. 15
INVENTOR.
Douglas Kelvin Gowland
BY
H. W. Brelsford
ATTORNEY June 15, 1954
D. K. GOWLAND
2,680,921
MODEL SAILING SHIP
Filed July 9, 1952
3 Sheets-Sheet 3
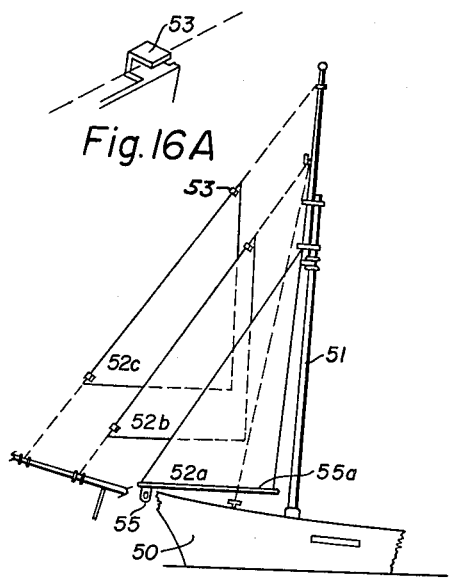
Fig.16A
Fig.16
Fig.17
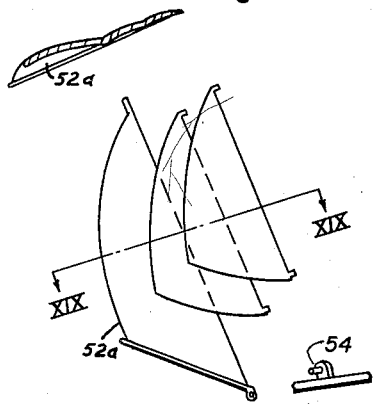
Fig.19
Fig.18  Fig.18A
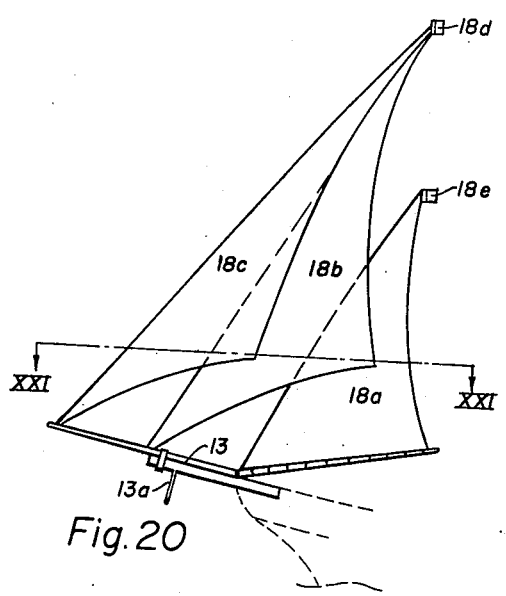
Fig.20
Fig.21
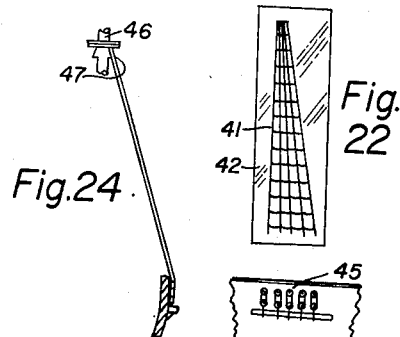
Fig.24
Fig.22
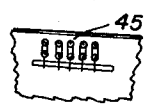
Fig.23
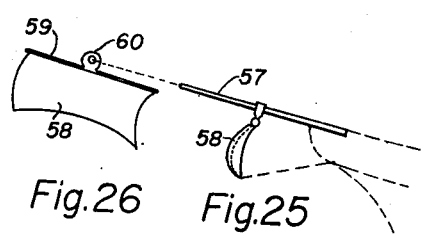
Fig.26  Fig.25
INVENTOR.
Douglas Kelvin Gowland
BY
H. W. Brelsford
ATTORNEY Patented June 15, 1954

2,680,921

UNITED STATES PATENT OFFICE 2,680,921

MODEL SAILING SHIP

Douglas Kelvin Gowland, Santa Barbara, Calif., assignor to Gowland & Gowland, Santa Barbara, Calif., a partnership Application July 9, 1952, Serial No. 297,937

8 Claims. (Cl. 41—10)

My invention relates to model ships and has particular reference to a kit construction for model ships wherein the various parts of the ship are preformed and are readily fitted together by means of locators formed on the preformed parts.

The difficulty of making faithful and accurate models of ships, especially sailing ships, has deterred many persons from engaging in this interesting endeavor. This represents a loss of educational opportunity, especially in persons of school age and also represents a considerable loss in recreational activity and therapy. The minute details of rigging, sail construction and masts and spars has heretofore limited the making of acceptable ship models to those manually skilled in the art. Even when such parts are prefabricated, the close precision and required accuracy of manipulation have limited this activity to the very skillful.

I have devised a ship construction for model ships which permits the making of accurate ship models that are acceptable in appearance and faithful in detail, by persons possessed of only ordinary skill. My invention includes the preforming of entire assemblies and sub assemblies of ship parts as a single unit. Various types of assemblies may be fitted together to form a complete ship, and I have devised means for keying these assemblies together so that they may be accurately positioned or located with respect to each other. The pieces may be glued or otherwise secured together in their keyed positions.

It is therefore an object of my invention to provide a model ship that is accurate in detail and acceptable in appearance which can be made by persons of ordinary skill.

Another object is to provide a construction kit for ships wherein assemblies and sub assemblies of parts are formed as a single unit.

Still another object is to provide a construction kit for ships having assemblies of parts formed as a unit and provided with locators for keying the ship assembly together.

Other objects and advantages of my invention will be apparent in the following description and claims considered together with the accompanying drawings in which:

Fig. 3 is an elevation view of the square sail assembly of the ship of Fig. 1;

Fig. 4 is a top view of Fig. 3;

Fig. 5 is a side view of Fig. 3;

Fig. 6 is an elevation view of a single piece mast construction;

Fig. 7 is an elevation view of a shroud and ratline assembly constructed in accordance with the invention;

Fig. 8 is an enlarged fragmentary top view of Fig. 7;

Fig. 9 is an enlarged fragmentary sectional view along the line IX—IX of Fig. 7;

Fig. 10 is a sectional view through a modified form of ship hull illustrating mast positioning and shroud positioning;

Fig. 11 is a view along the lengthwise axis of a ship showing a modification of the invention as applied to a mast and topmast construction, both supported by shroud assemblies;

Fig. 12 is a transverse fragmentary sectional view through the ship of Fig. 1 illustrating the hull construction;

Fig. 13 is a side view of a mast and sail assembly of the ship of Fig. 1;

Fig. 14 is a view from aft to fore on the ship of the sail and mast assembly of Fig. 13;

Fig. 15 is an end view of a two-part bottle having a ship disposed therein constructed in accordance with the invention;

Fig. 16 is a side view of a modified form of ship structure and modified form of jib sail structure;

Fig. 16A is an enlarged fragmentary perspective view of the line hooks integrally formed on the sail for engaging supporting lines or threads;

Fig. 17 is a view from aft to forward of the sail assembly of Fig. 16;

Fig. 18 is a quarter view from the aft portion of the ship of the sails of Fig. 16;

Fig. 18A is an enlarged fragmentary view of a portion of the bowsprit of Fig. 16 showing a pintle or pin for positioning the sail assembly;

Fig. 19 is a sectional view along the line XIX—XIX of Fig. 18;

Fig. 20 is an elevation or side view of the bowsprit and jib sail assembly of the ship of Fig. 1;

Fig. 21 is a sectional view along the line XXI—XXI of Fig. 20;

Fig. 22 is an elevation view of a modified form of shroud and ratline assembly printed on transparent material;

Fig. 23 is a fragmentary elevation view of a side portion of a ship hull with deadeyes molded thereon for use with the printed shroud assembly;

Fig 24 is a fragmentary sectional view of a hull showing the assembly of the shrouds of Fig. 22 to the hull of Fig. 23;

Fig. 25 is a modified form of bowsprit and bow square sail assembly;

Fig. 26 is an elevation view of the sail of Fig. 25.

The invention is described with reference to a barkentine type of sailing ship for illustrative purposes only, because this ship type combines square rigged sails with fore and aft sails, as well as jib sails and thus illustrates the invention as applied to the principal sail types. The invention is equally applicable to sailing ships of all kinds, including the most ancient and the modern types.

Figure 1:
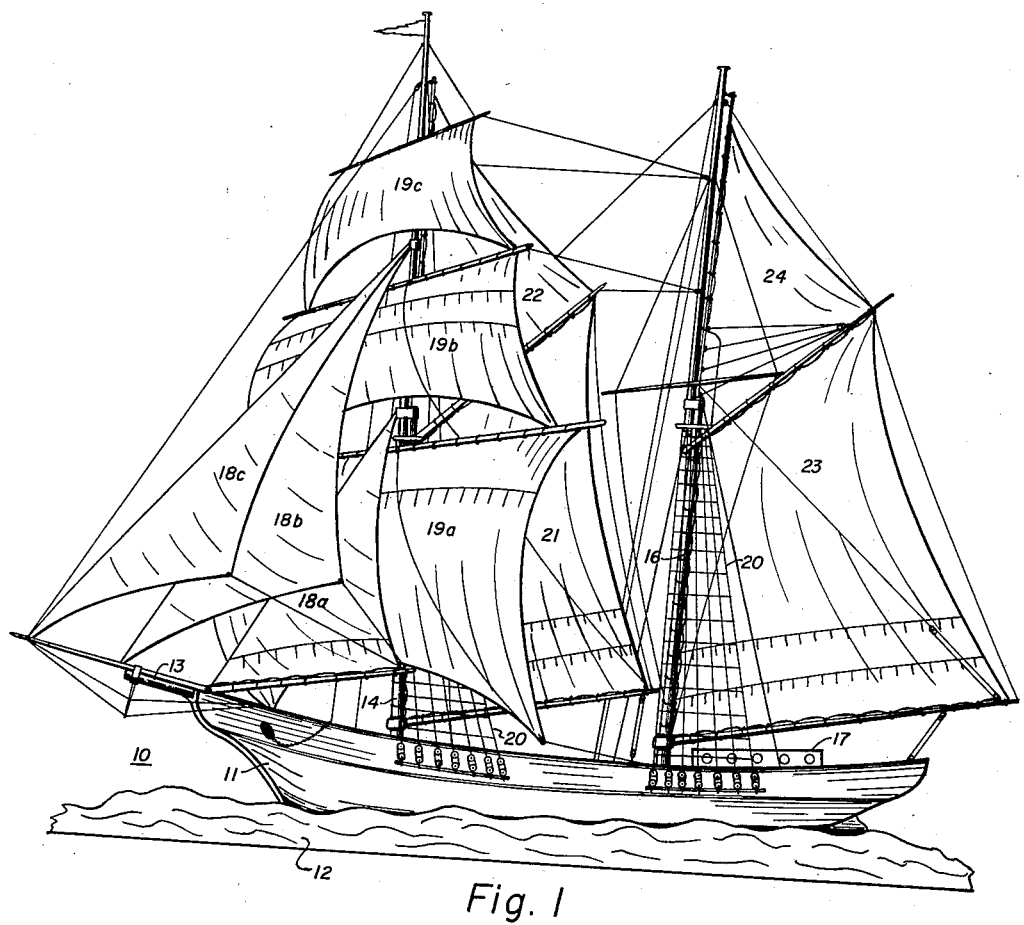
Fig. 1 is a side view of a brig or barkentine type of sailing ship constructed in accordance with my invention.
Figure 2:
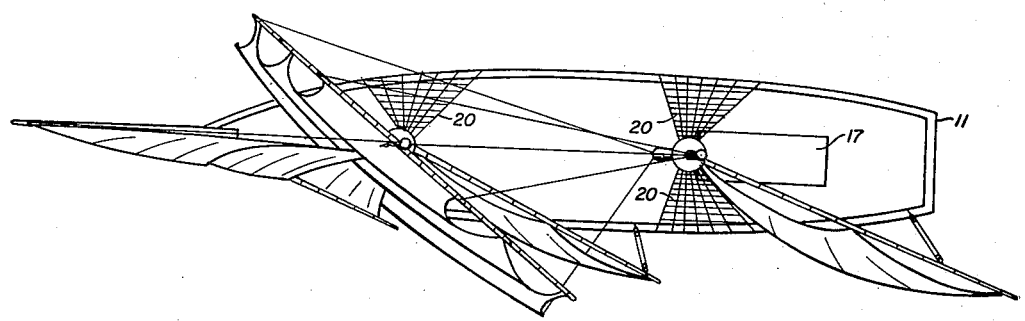
Fig. 2 is a top view of the ship of Fig. 1.

Referring to Figs. 1 and 2 there is disclosed a ship 10 having a hull 11 resting upon an artificial sea or body of water 12. Projecting from the hull 11 may be a bowsprit and a jib boom assembly 13, a foremast assembly 14, and a mizzenmast assembly 16, as well as a deckhouse 17. The foremast assembly 14 and the mizzenmast assembly 16 may each be supported by a pair of shroud and ratline assemblies 20 which may be identical for both masts if desired.

Supported between the bowsprit assembly 13 and the foremast assembly 14 may be a set of headsails 18a, 18b, and 18c. Supported by the foremast 14 may be a set of square sails 19a, 19b, and 19c. The foremast assembly 14 may also carry a set of fore and aft sails including a mainsail 21 and a topsail 22. The mizzenmast assembly 16 may likewise carry a set of fore and aft sails including a mainsail 23 and a topsail 24.

Referring especially to Fig. 1 it will be noted that the various sails are fully bellied. The sails may thus simulate actual sails in all true essentials to give a realistic visual impression. Even the headsails are permitted substantial bellying despite the fact that these overlapping sails are molded in one piece.

While various techniques and modes of construction may be followed in forming the different parts of my ships, I prefer machine techniques that employ a minimum of hand operations and which have a high rate of production. Various procedures give the desired low cost and high fidelity to detail such as metal molding, embossed sheet structure, hot and cold forging or coining processes, etc. At present I prefer to employ organic plastic material that is pressure molded by any one of the several processes now commercially accepted. Thermoplastic materials are preferable, and the moldings thus produced are uniformly free from defects and show the fine details so necessary to true authenticity and acceptable quality.

The construction of the headsails is shown in detail in Figs. 20 and 21. At present I prefer to form the headsails 18 and the bowsprit assembly as a single unit or molding. The juncture of the sails with the bowsprit is therefore not a true point contact but instead has an appreciable contact dimension lengthwise of the bowsprit. This, however, does not distract from the overall visual impression, but greatly aids the mechanical strength between sails and bowsprit, and especially facilitates molding. The bowsprit may have a downwardly depending dolphin 13a integrally molded thereon and suitable guys or stays may be rigged manually from the tip of the bowsprit assembly to the hull of the ship, as shown in Fig. 1. The bowsprit may have its large end fitted into a notch in the hull 11, the hull outline being shown in Fig. 20. This notch fit therefore acts as a locator for the bowsprit and the lower end of the headsails, and removes the necessity for determining its location by the person assembling the ship.

The upper end of the headsails 18 may be secured to the mast 14 by locators 18d and 18e disposed at the ends of sails 18c, 18b, and 18a respectively. These locators may be U-shaped or semicircular to partially encircle the mast as shown in Fig. 1. The locators 18d and 18e thus positively position the upper end of the headsails. The person assembling these parts needs merely to place cement in each locator and securely press the locators against the mast until the cement or glue sets. The contact of the sails with the locators is sufficiently large, as illustrated, in cross sectional area to give good mechanical strength and to facilitate molding.

The one piece nature of the headsails is clearly illustrated in the sectional view of Fig. 21. The leading edge of each sail should be substantially in the plane of the bowsprit assembly 13 and the mast 14. The sail may belly out from this leading edge constrained by the proper braces. Because the sails overlap, however, there is a molding problem due to the necessary draw for simple mold types. For this reason, the two sides of the sails cannot be parallel and the two jibs 18c and 18b must be constructed with an interior curvature 18f as there illustrated. This construction gives an acceptable appearance when viewed from either side, and the thickened sections of Fig. 21 are not apparent from casual visual inspection.

Referring to Figs. 3, 4 and 5 there is illustrated the construction of the square sails 19a, 19b, and 19c. I have discovered that by careful mold design all three sails may be molded as a single molding from organic plastic or similar material, including the various spars associated with the square sails. I prefer to minutely engrave or otherwise construct my molds so that the minutest detail of sail and spar construction is faithfully carried out, including reefing bands 26 and the reefing points or short lengths of line 27 attached at the reefing bands for reefing or shortening the sails. Further, I prefer to form the lashings 28, by which the upper part of the square sails are secured to the various spars or cross arms 29, integrally and preformed with the sails.

Formed on the sail assembly 19 may be locators 31 in the form of U-shaped projections which partially embrace a mast to which the sail may be secured. These locators 31 are provided particularly in accordance with my invention and in the case of square sails may be formed opposite or on the back of the spars 29 so that they are the least inconspicuous and have the greatest mechanical strength at this location. The sails can be set at any angle on the masts because the joint between the locators and the mast permits rotation to a selected angle. The square sails are preferably formed in a bellied condition with the sails having a true sheet thickness so as to simulate actual sails. The two lower corners of the lower sail 19a may be slit as at 32 or apertured as desired to form a suitable point to which threads may be glued or otherwise attached.

The fore and aft sails 21 and 22 may be molded or otherwise formed as a single unit together with the mast 14, as shown in Figs. 13 and 14. Also a boom 33, a gaff 34, and a topsail gaff 36 may be formed on the same molding. By means of careful engraving of molds, the fine details of sail hoops about the mast, rigging for the gaffs, reefing lines and boom lashings or lacings may also be included. The proper belly can be given to the mainsail and the topsail for realistic effect. The mizzenmast 16 and its sails may be identical with those of Figs. 13 and 14.

The forming of sail, mast, booms, and gaffs as a single molding eliminates a tremendous amount of rigging and assembly work otherwise required of the model maker. The placing of hoops about the mast for example would ordinarily call for a great time expenditure in making these miniature parts, plus the tying to the sail and passing about the mast. The present invention eliminates this minute work and produces parts of a true three dimensional construction. In addition, the sails may be given a belly, an operation that is most difficult with fore and aft sails with the usual materials available. The mast need merely to be mounted in the hull, giving any desired angle to the sails, and a large part of the ship construction is thereby finished.

The construction of the shrouds is shown in Figs. 7, 8, 9, and 12. Also, the construction of the hull is illustrated in Fig. 12. The hull 11 may be formed of two separate parts, each defining the hull sides for half of the ship. The hull sides may be cemented to the artificial sea 12, and each side half 11a is provided with projections or locators 11b. A deck 11c may rest on these locators and may be formed with wells 11d for receiving the masts. The decks may have all types of structures and gear integrally formed or molded on them, such as guns, the deckhouse 17, dories, ladders, hatches, etc.

The shrouds 20 may be molded integrally with ratlines 20a and deadeyes 37, and channels 38 may be part of this molding also. A pin projecting from the channel and fitting a hole in the hull half 11a may act as a locator for the lower end of this assembly 20. The upper end of the shrouds may be provided with a semicircular locator 39 illustrated in Fig. 8, to engage the mast and accurately position the upper end of the assembly. The shroud ropes may be of greater section than the ratlines as appears in Fig. 9.

An alternative construction wherein a channel 41 is positioned at deck level and forms part of a shroud assembly 42 is illustrated in Fig. 10. The use of shroud assemblies on top masts is illustrated in Fig. 11.

When it is desired to avoid the very considerable expense of making satisfactory molds and dies for the detailed construction of Figs. 7 and 12, I have found that a printing technique may be satisfactorily employed. This construction is illustrated in Figs. 22, 23, and 24. The shroud line and ratlines may be printed as an assembly 41 on a piece of transparent plastic 42 of any suitable type. The person constructing the ship needs merely to cut out the outline of this assembly from the sheet. In this construction the channel may be set low on the hull of the ship as illustrated in Fig. 23. Deadeyes may be integrally molded with the hull and channel. The deadeyes preferably terminate slightly below the top of the hull side to provide a locator area 45. The cut out shroud assembly may then be glued or cemented to the locator area 45 as illustrated in Fig. 24 and the upper end glued to a mast 46 provided with a pair of flat sections 47 for this purpose.

This printing technique is very effective in actual practice, permitting all parts of the ship to be viewed through the transparent material between the shroud lines. Only when light is reflected from this window portion is it possible to detect that a printed sheet has been employed. When the ship is placed inside a bottle it is practically impossible to detect this sheet construction because of the diminished reflection action. As an alternative construction, the upper part of the deadeyes may project a short distance above the side of the hull and the transparent sheet may be glued to these as locators.

Illustrated in Figs. 16 through 19 are headsails or jib sails which are at least partially suspended from simulated lines extending from mast to bowsprit. A hull 50 may have a mast 51 and bowsprit attached thereto in accordance with the invention. A set of jib sails 52a, 52b, and 52c may overlap each other and the latter two may be provided with hooks 53 (Fig. 16A) at each end of their leading edges. These hooks 53 are designed to be integrally formed or molded at the same time the sails are formed and hence one side is preferably fully open to permit the necessary die draw. The lines may be stretched between bowsprit and mast and the hooks then passed over them and glued in position.

A suitable locator may be provided on the bowsprit by means of a pin 54 over which an eye 55 may pass. The eye may be disposed on the jib or staysail club 55a. The upper end of sail 52a may be cemented to the mast, with or without a locator.

Illustrated in Figs. 25 and 26 is a bowsprit and square sail for the bowsprit, of the type used on earlier sailing ships. A plain spar bowsprit 57 may support a sail 58 having a spar 59 along the upper edge to which it is lashed and projecting from this spar may be an apertured lug 60 which fits over the spar 57. The lug 60 may be cemented to the bowsprit at the selected location. The sail may be molded or otherwise formed with the spar integral therewith and may have a realistic three dimensional curvature to simulate actual sails.

Various types of ships require different techniques of elaboration or artistic finish. The sails for example may be painted white, the masts, boom and spars brown, the deck tan, and the hull black, for example. The lines and rigging including printed shroud assemblies may be brown in color if desired. These colors may be added by the person assembling the ship, regardless of the original color of the parts formed in accordance with the invention.

The various reefing bands and lines and lashing, hoops, etc. may be engraved in the molds mentioned previously, and for the person desiring the ultimate in artistic effect, these may be painted to make them stand out, as by a hair brush. Certain of the historic sailing ships had designs formed in the sails and these may be provided to the assembler in the form of decalcomanias, either in black and white or color. Flags and pennants may be furnished as printed in color on paper or cloth. The gunboats may have a hull with a minutely recessed strip along the gun port area and a strip of paper with the gun ports printed thereon may be disposed in this recess. The designs on transoms may be in color and applied by decalcomania or other preformed process.

Many details of equipment and rigging may be integrally molded or otherwise formed on the hull itself. Deadeyes and channels have previously been mentioned, but anchor ports, anchor chains, ports of various types, lamps, railings and other items can be formed. Some gear, such as lamps, may be separately formed and cemented in locator holes in the hull. The deck may contain various items integrally molded as previously mentioned. Deck planking may be indicated by grooves and peg holes. Coiled rope, anchors, guns and other items may also be formed on deck surfaces.

The invention is applicable to model ships that are used per se as items of ornament, resting upon a shelf, mantle or other support. Their attractiveness may be enhanced and the models may be kept free of dust by enclosing in a bottle as illustrated in Fig. 15. In this event the bottle may be formed in complementary halves and cemented inconspicuously along the center line to simulate a glass bottle of solid construction. This gives added interest because of the implication of constructing the ship within the bottle. The model ships may also be provided with an angle bracket for fastening them to a wall, the angle extending under the "ocean" 12.

From the foregoing description it will be apparent that my ship construction permits persons of ordinary skill to assemble, and in a sense, construct model sailing ships that are accurate in outline, acceptable in appearance and faithful in detail. The casual person needs only to complete the rigging lines, but the more conscientious persons will paint the parts appropriate colors and apply any flags, pennants or decalcomanias. For extreme detail and striking appearance, the minutely formed details may be accented by color. The ship lends itself to merchandising as a kit or as an assembled unit, and may be embodied in a bottle or similar device.

As used herein the term "hull" includes decks, the term "spar" includes booms, gaffs, yards, and clubs, the word "locator" means mechanical construction to positively position two parts with respect to each other, "mast assembly" includes a plurality of spars secured together to form a mast, and the word "manufactured" is used to distinguish from hand construction.

While I have described several variations or modifications, these are illustrative only and not limiting. Various modifications will be apparent to those skilled in the art and for this reason I do not limit myself to the disclosure nor otherwise, but claim all modifications and variations as fall within the true spirit and scope of the invention.

I claim:

1. An assembled model sailing ship made of molded plastic parts comprising: a molded plastic hull having a plurality of deck cavities; a plurality of molded plastic masts respectively disposed in the cavities to stand upright; and a plurality of square sail and spar assemblies molded as a single structural piece and secured to the masts respectively, each assembly having a plurality of square sails in vertical array, a spar formed along the top of the sails, at least two junctions of the lower tips of an upper sail with the spar of a lower sail being of substantial cross section to facilitate molding as an integral unit, said sails being curved in angularly related planes to provide bellies therein, and a generally semi-circular locator formed on one side of at least one spar for positively positioning the sail and spar assembly on the mast.

2. An assembled model sailing ship made of molded plastic parts comprising: a molded plastic hull having a plurality of deck cavities; at least one separate mast molded of plastic positioned in one of said cavities; a plastic square sail and spar assembly positioned on said separate mast and molded as a single structural piece, said square sail assembly having a plurality of square sails in vertical array each having a compound curve to form a belly therein, a spar formed along the top of the sails, at least two junctures of the lower tips of an upper sail with the spar of a lower sail being of substantial cross section, and a generally semi-circular locator formed on one side of at least one spar for positively positioning the assembly on the mast; and at least one plastic mast and fore-and-aft sail assembly having a mass of circular cross-section and having a lower end projecting into another of said cavities, said assembly being molded as a single structural piece and having a boom connected to the mast, a gaff connected to the mast, and a sail connected to the boom and gaff and mast and being curved in angularly related planes to provide a belly therein.

3. An assembled model sailing ship made of molded plastic parts comprising: a molded plastic hull having a plurality of deck cavities; a plurality of molded plastic mast and sail assemblies each having a mast of circular cross section having a lower mast end projecting into the deck cavities respectively to position the mast, said assemblies also having integrally molded with the mast a boom having a circular cross section and being connected to the mast, a gaff connected to the mast, and a sail connected to the boom and gaff and the mast and being curved in angularly related planes to provide a belly therein, the mast, boom gaff and sail elements of each assembly forming a single structural piece wherein the sail supports the mast, the boom and the gaff.

4. A model sailing ship made of molded plastic parts comprising: a molded plastic hull having at least one mast locator recess and one bowsprit locator recess; a molded plastic mast disposed in said mast recess; a molded plastic sail and spar assembly secured to the mast; and a plurality of plastic headsails and a plastic bowsprit molded as a single structural unit, said bowsprit being disposed in said bowsprit recess to position said headsails between said mast and bowsprit, said headsails having portions thereof overlapped and molded together to provide overlapping areas of greater thickness than the remaining portions of said headsails and all of said headsails being curved to provide a sail belly therein.

5. An assembled model sailing ship made of molded plastic parts comprising: a molded plastic hull having at least three aligned locator recesses, one of which is located at the bow of the hull; a plurality of plastic headsails and a plastic bowsprit molded as a single structural piece, said bowsprit being disposed in said bow recess; at least two molded plastic masts respectively disposed in the other recesses; and a plurality of plastic mainsail and supporting spar assemblies respectively secured to the masts and each assembly being molded as a single structural piece.

6. An assembled model sailing ship as set forth in claim 5 wherein said headsails are provided with overlapped portions molded together to provide overlapping areas of greater thickness than the remaining portions of said headsails.

7. An assembled model sailing ship made of molded plastic parts comprising: a molded plastic hull having a deck recess; a molded plastic mast disposed in the recess in an upright position; a molded plastic sail secured to the mast; and at least one narrow strip of transparent sheet material extending in space from the hull to the mast and having simulated shroud lines printed thereon.

8. The combination of a transparent bottle and an assembled model sailing ship therein, said ship comprising a molded plastic hull having a deck recess, a molded plastic mast disposed in the recess in an upright position, a molded plastic sail secured to the mast, and a narrow strip of transparent sheet material extending in space between the hull and the mast and having simulated shroud lines printed thereon, said bottle reducing the light reflection from the transparent sheet to give a realistic impression of shroud lines in space.

References Cited in the file of this patent

UNITED STATES PATENTS

| Number | Name | Date |
|---|---|---|
| 785,573 | Ringo | Mar. 21, 1905 |
| 986,963 | Breitung | Mar. 14, 1911 |
| 1,781,313 | Blau | Nov. 11, 1930 |
| 1,803,372 | Vivier | May 5, 1931 |
| 1,857,094 | Doerfler | May 3, 1932 |
| 1,943,474 | Goldberg et al. | Jan. 16, 1934 |
| 2,050,453 | Newton | Aug. 11, 1936 |
| 2,115,986 | DaCosta | May 3, 1938 |
| 2,351,542 | Paull | June 13, 1944 |
| 2,451,913 | Brice | Oct. 19, 1948 |
| 2,515,171 | Abel | July 18, 1950 |
| 2,545,706 | Rosenberg | Mar. 20, 1951 |
| 2,572,412 | Wharton | Oct. 23, 1951 |

FOREIGN PATENTS

| Number | Country | Date |
|---|---|---|
| 708,967 | France | May 5, 1931 |
| 590,964 | Great Britain | Aug. 1, 1947 |

OTHER REFERENCES

1948 Johnson Smith and Co. Novelties Catalog. Page 104.